United States Patent [19]

Blum

[11] Patent Number: 4,614,012

[45] Date of Patent: Sep. 30, 1986

[54] DRILLING AND MOUNTING MACHINE

[75] Inventor: Dietmar Blum, Höchst, Austria

[73] Assignee: Julius Blum Gesellschaft m.b.H., Höchst, Austria

[21] Appl. No.: 709,283

[22] Filed: Mar. 7, 1985

[30] Foreign Application Priority Data

Mar. 28, 1984 [AT] Austria ................................ 1036/84

[51] Int. Cl.[4] ........................ B23P 23/04; B23P 19/04

[52] U.S. Cl. .................................. 29/33 K; 29/26 A; 29/700; 144/92

[58] Field of Search .................. 29/26 A, 33 K, 26 R, 29/11, 434, 700; 144/2 B, 353, 1 R, 3 R, 3 E, 27, 92

[56] References Cited

U.S. PATENT DOCUMENTS

| | | | |
|---|---|---|---|
| 1,060,173 | 4/1913 | Edwards | 29/26 A |
| 2,214,666 | 9/1940 | Elf et al. | 408/68 |
| 4,100,661 | 7/1978 | Cheak | 144/3 E X |

*Primary Examiner*—Gil Weidenfeld
*Assistant Examiner*—Steven C. Bishop
*Attorney, Agent, or Firm*—Wenderoth, Lind & Ponack

[57] ABSTRACT

A drilling and mounting machine for drilling fastening holes for furniture fittings and for inserting the furniture fittings includes a frame, a driving motor (7) for a drill, a feed device and an inserting unit for inserting the furniture fittings. The feed device includes an operating lever and thrust members. The thrust members are linked to a housing for the drilling gear, and the inserting unit is mounted at the point of linkage so that a feed force is transmitted directly onto the housing or onto the inserting unit.

4 Claims, 2 Drawing Figures

DRILLING AND MOUNTING MACHINE

FIELD AND BACKGROUND OF THE INVENTION

The invention relates to a drilling and mounting machine for drilling fastening holes for furniture fittings, in particular hinges, into furniture parts and for mounting furniture fittings at the furniture parts, and of the type including a frame, a driving motor for drills, a drill gear with drill sleeves, an inserting unit for the furniture fittings and feed means.

In modern furniture construction, apart from complicated automatic drilling machines by means of which complete drilling patterns can be drilled into a furniture wall or door in a single operation, drilling machines are also known which are particularly used by joiners and by means of which, for example, only one bore row or the holes for mounting hinges can be drilled in one operation, whereupon the machine may have to be reset for further drilling operations. These drilling machines have more than one drill spindle, and hence make it possible to drill simultaneously, a number of holes at spaced intervals, for example 32 mm, or the three holes required for mounting many hinge casings.

It has lately become known to provide the latter-mentioned drilling machines with an inserting unit so that immediately after the drilling of the fastening holes, a fitting part, for example a hinge, can be inserted into the furniture part by means of the same machine. It is known to press such inserting unit by means of hydraulics or by hand by means of a gear.

SUMMARY OF THE INVENTION

It is the object of the invention to provide an improved drilling machine of the latter-mentioned kind such that the forces which occur when the fitting part is inserted into the furniture part, and which are relatively high when compared to the forces of the feed motion of the drills, are better diverted than with known drilling and mounting machines, and such that, on the whole, the actual drilling part of the machine is not stressed or only to a minimum extent during the inserting operation.

According to the invention this is achieved in that the feed means are linked to the housing of the drilling gear at a point or points of linkage and that the inserting unit is pivotally mounted at the same point or points of linkage.

A further feature of the invention provides that the bearing points for the feed means are arranged at two sides of the housing, and that the feed means includes an operating lever with two lever arms, each of them being connected by means of a thrust member with one of the bearing points formed by journals.

While conventional drilling machines are provided with a pressure lever only at one side, the arrangement according to the invention permits an absolutely uniform transmission of the relatively great inserting pressures for mounting the fitting part.

To guarantee exact positioning of the inserting unit, also in the case of sudden pivoting motions, a further feature of the invention provides a stop screw at a side near the housing. The stop screw is adjustable to a greater or lesser extent so that the angular position of the inserting unit is adjustable.

A further feature of the invention provides that in the housing of the drill gear there is a twistable and/or exchangeable insert in which the mechanical gear parts are arranged.

By means of a drilling and mounting machine according to the invention, different drill patterns can be drilled by simply exchanging or twisting the gear housing, as required by different types of fittings, for example hinge casings to be fastened to a furniture door and mounting plates for hinge arms to be mounted at furniture side walls.

BRIEF DESCRIPTION OF THE FIGURES OF THE DRAWINGS

Below an embodiment of the invention will be described in more detail with reference to the accompanying drawings, in which.

DESCRIPTION OF THE PREFERRED EMBODIMENT

Figure 1:
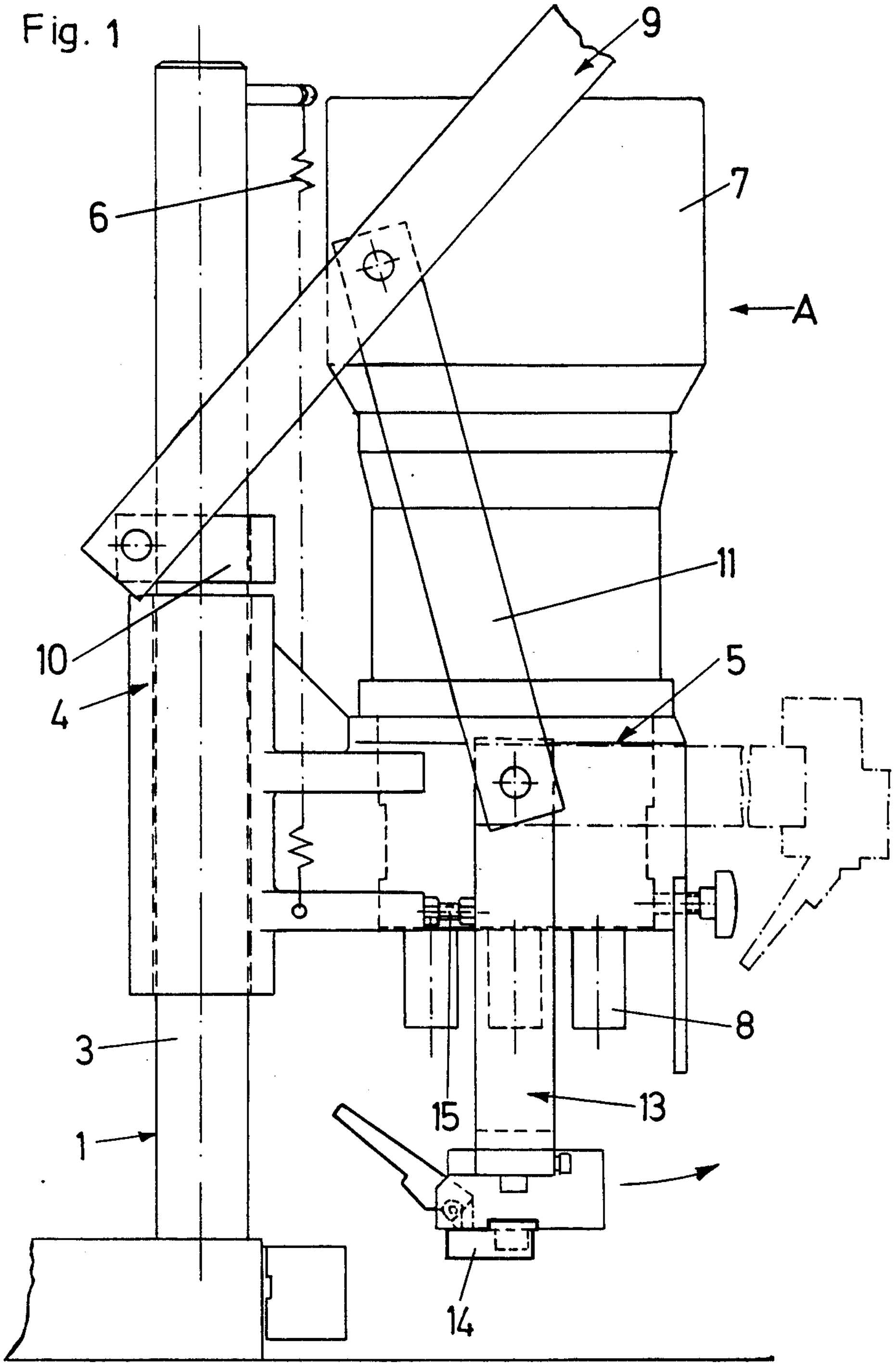
FIG. 1 is a schematic side view of a drilling and mounting machine according to the invention.
Figure 2:
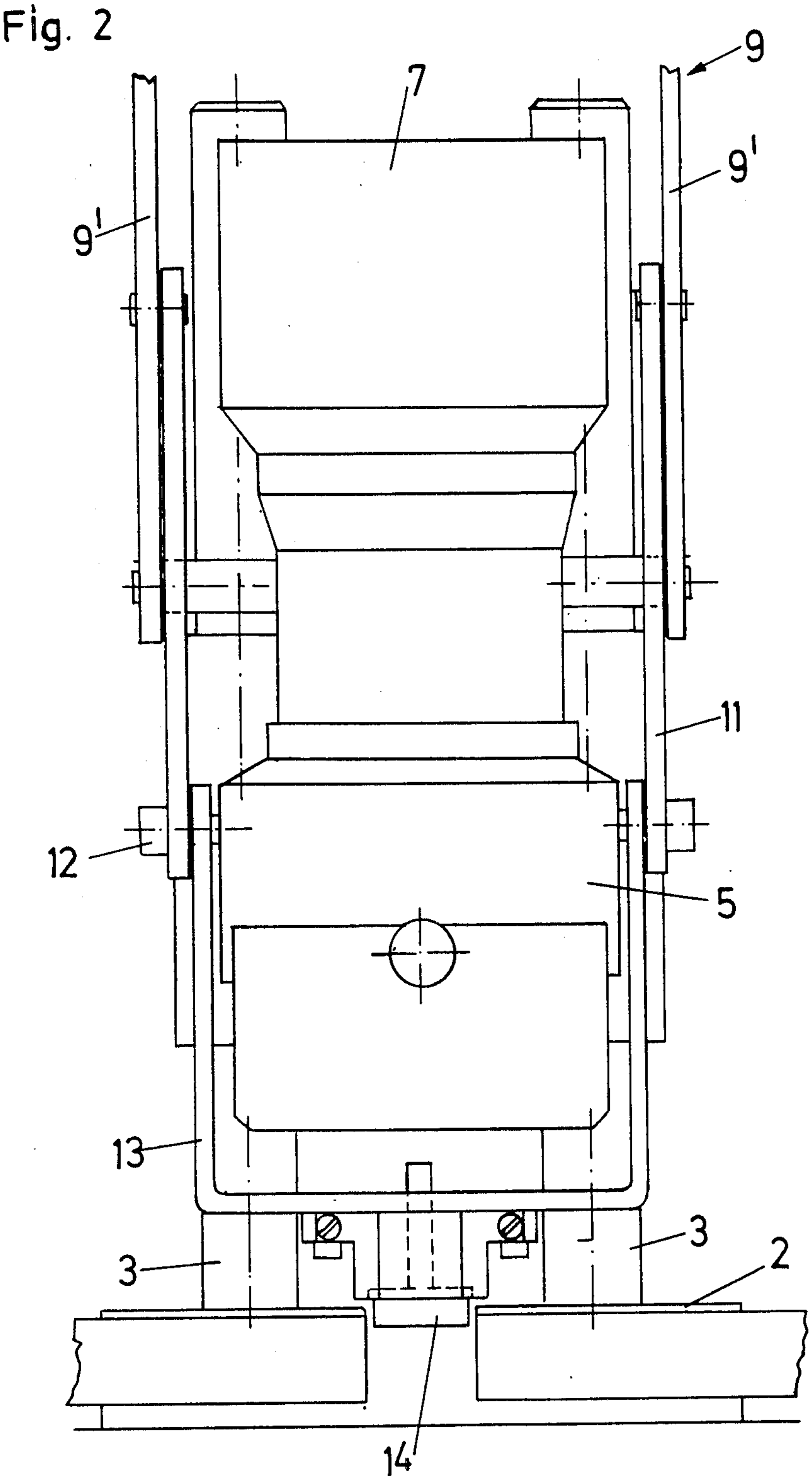
FIG. 2 is a view thereof from the direction of arrow A of FIG. 1.

The drilling and mounting machine according to the invention comprises a frame 1 which is provided with a work piece support 2 and support and guide members 3 for a drilling aggregate. A support 4 which carries a housing 5 for a drill gear is slideably mounted on the guide members 3 in a conventional manner. The drill gear is suspended with the support 4 from the guide members 3 by means of one spring or a number of springs 6.

An electromotor 7 which forms the drill drive is mounted on the housing 5 of the drill gear. In the illustrated embodiment, the drill gear arranged in the housing 5 is provided with drill sleeves 8.

An operating lever 9 for the forward feed of the housing 5 is fastened to the guide members 3 in a conventional manner by means of clamps 10. Operating lever 9 includes lever arms 9' supported at opposite sides of the housing 5 by means of respective thrust members 11 which are mounted by means of journals 12.

An angular inserting unit 13, which serves for the insertion of a furniture fitting, for example a hinge 14, also is pivotally mounted at the journals 12.

When the inserting unit 13 is in the withdrawn position indicated in FIG. 1 by dashed lines, bore holes can be drilled, as with a conventional drilling machine, by pressing down the operating lever 9. When the drilling operation has been finished, the desired furniture fitting, e.g. hinge 14, can be inserted into the inserting unit 13, and the inserting unit can be moved to a vertical inserting position, i.e. into the position indicated in FIG. 1 by solid lines. The correct position of the inserting unit 13 is in this case guaranteed by a stop screw 15.

By pressing down the operating lever 9, the fitting then is pressed into the respective furniture part. The special arrangement of the operating lever 9, the thrust member 11 and the inserting unit 13 ensuring that no stresses act upon the parts associated with the drilling mechanism. The housing 5 is moved together with the drill gear and the drilling motor 7, but it does not have to absorb or divert any pressure forces.

What is claimed is:

1. A drilling and mounting machine for drilling fastening holes for furniture fittings, for example hinges, in furniture parts, and for mounting the furniture fittings in the thus drilled furniture parts, said machine comprising:

a frame;

a housing supporting a drilling mechanism including a drill gear, drill sleeves and a driving motor, said housing being movably mounted on said frame;

feed means, pivotally connected to said housing at at least one point of linkage, for moving said housing with respect to said frame; and an inserting member, pivotally mounted at said point of linkage between an inserting position and a withdrawn position;

whereby, with said inserting member in said withdrawn position thereof operation of said feed means enables drilling of holes in a furniture part, and thereafter with said inserting member in said inserting position thereof operation of said feed means enables insertion of a furniture fitting into the thus drilled furniture part without application of insertion pressures to said drilling mechanism.

2. A machine as claimed in claim 1, comprising a said point of linkage on each of two opposite sides of said housing, each said point of linkage being defined by a journal forming a bearing point, and said feed means comprises an operating lever having two lever arms, and a pair of thrust members, each said thrust member being connected to a respective said lever arm and linked to a respective said bearing point.

3. A machine as claimed in claim 1, further comprising a stop screw adjustably mounted adjacent said housing for adjustably limiting said inserting position of said inserting member.

4. A machine as claimed in claim 1, further comprising an exchangeable and adjustable insert mounted within said housing and supporting said drill gear.

* * * * *